US012658389B2

(12) United States Patent
Hofsaess

(10) Patent No.: US 12,658,389 B2
(45) Date of Patent: Jun. 16, 2026

(54) CASING FOR A TEMPERATURE-DEPENDENT SWITCH AND SEALED SWITCHING DEVICE

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 296 days.

(21) Appl. No.: 18/611,289

(22) Filed: Mar. 20, 2024

(65) Prior Publication Data

US 2024/0321537 A1 Sep. 26, 2024

(30) Foreign Application Priority Data

Mar. 23, 2023 (DE) ..................... 10 2023 107 382.6

(51) Int. Cl.
*H01H 37/04* (2006.01)
*H01H 37/52* (2006.01)

(52) U.S. Cl.
CPC ............ *H01H 37/04* (2013.01); *H01H 37/52* (2013.01)

(58) Field of Classification Search
CPC ............................... H01H 37/04; H01H 37/52
USPC .......................................................... 337/333
See application file for complete search history.

(56) References Cited

U.S. PATENT DOCUMENTS 4,297,668 A * 10/1981 Place ................. H01H 37/5436 337/380
4,626,821 A 12/1986 Versaw
4,887,063 A * 12/1989 Hofsass ............. H01H 37/5427 337/380
5,011,101 A * 4/1991 Buchser .................. F25D 21/08 248/314
5,307,543 A * 5/1994 Krillenberger .......... F16B 2/245 248/74.2

(Continued)

FOREIGN PATENT DOCUMENTS

CN 202473746 U 10/2012
DE 8713929 U1 12/1987

(Continued)

OTHER PUBLICATIONS

Office action issued by the Japanese Patent Office for application JP 2024-039873 on Nov. 26, 2024.

(Continued)

*Primary Examiner* — Anatoly Vortman
(74) *Attorney, Agent, or Firm* — Reising Ethington P.C.

(57) ABSTRACT

A casing for receiving, in a hermetically sealed manner, a temperature-dependent switch that switches in a temperature-dependent manner between a closed state, in which the switch establishes an electrically conductive connection between a first external terminal and a second external terminal, and an open state, in which the switch disconnects the electrically conductive connection. The casing comprises a first metal casing part; a second metal casing part fixed to the first metal casing part via a hermetically sealing, electrically insulating connection; and a third electrically insulating casing part arranged between the first and second metal casing parts. The first and second metal casing parts together form a receptacle for the temperature-dependent switch, in which the switch, when inserted into the receptacle, is electrically connected to the first metal casing part by its first external terminal and electrically connected to the second metal casing part by its second external terminal.

15 Claims, 5 Drawing Sheets

(56) References Cited

U.S. PATENT DOCUMENTS

| | | | | | |
|---|---|---|---|---|---|
| 5,699,033 | A * | 12/1997 | Hofsass | H01H 37/5427 | 337/380 |
| 5,828,286 | A * | 10/1998 | Hofsass | H01H 37/5427 | 337/380 |
| 5,864,279 | A * | 1/1999 | Becher | H01H 37/5427 | 337/380 |
| 5,877,671 | A * | 3/1999 | Hofsass | H01H 37/5427 | 337/380 |
| 6,417,758 | B1 * | 7/2002 | Russell | H01H 37/043 | 248/65 |
| 6,724,293 | B1 * | 4/2004 | Hofsass | H01H 37/04 | 337/380 |
| 6,781,504 | B2 * | 8/2004 | Scott | H01H 37/043 | 337/380 |
| 8,284,011 | B2 * | 10/2012 | Hofsaess | H01H 37/5427 | 337/380 |
| 8,536,972 | B2 * | 9/2013 | Hofsaess | H01H 37/5427 | 337/380 |
| 12,482,620 | B2 * | 11/2025 | Hofsaess | H01H 37/5436 | |
| 2020/0365354 | A1 | 11/2020 | Hofsaess | | |

FOREIGN PATENT DOCUMENTS

| | | | | |
|---|---|---|---|---|
| DE | 3733693 | A1 | 5/1988 | |
| WO | WO-2016077850 | A1 * | 5/2016 | H01H 37/5436 |
| WO | WO2020108805 | A1 | 6/2020 | |

OTHER PUBLICATIONS

English translation of the office action issued by the Japanese Patent Office for application JP 2024-039873 on Nov. 26, 2024.
Search Report issued by the European Patent Office for application 24163348.6 on Sep. 11, 2024.

* cited by examiner

CASING FOR A TEMPERATURE-DEPENDENT SWITCH AND SEALED SWITCHING DEVICE

CROSS-REFERENCE TO RELATED APPLICATIONS

This application claims priority from German patent application DE 10 2023 107 382.6 filed on Mar. 23, 2023. The entire content of this priority application is incorporated herein by reference.

FIELD

This disclosure relates to a casing for hermetically sealing a temperature-dependent switch. This disclosure further relates to a sealed switching device comprising the casing and a temperature-dependent switch arranged therein.

BACKGROUND

An exemplary temperature-dependent switch is disclosed in DE 37 33 693 A1. This document also discloses a casing for receiving the temperature-dependent switch in a hermetically sealed manner.

Such temperature-dependent switches are used in a principally known manner to monitor the temperature of a device. For this purpose, the switch is brought into direct or indirect thermal contact with the device to be protected, so that the temperature of the device to be protected influences the temperature of the switching mechanism arranged inside the switch.

The switch is typically connected electrically in series into the supply circuit of the device to be protected via connecting cables, so that the supply current of the device to be protected flows through the switch below the response temperature of the switching mechanism.

Such temperature-dependent switches comprise a temperature-dependent switching mechanism which is arranged encapsulated in a switch housing and which, depending on its temperature, opens or closes an electrically conductive connection between the two external terminals of the switch. More precisely, the temperature-dependent switching mechanism is configured to switch in a temperature-dependent manner between a closed state, which the switching mechanism assumes below a response temperature and in which the switching mechanism establishes the electrically conductive connection between the two external terminals, and an open state, which the switching mechanism assumes above the response temperature and in which the switching mechanism disconnects the electrically conductive connection.

To enable the above-mentioned temperature-dependent switching function, the temperature-dependent switching mechanism arranged inside the switch housing usually comprises a bimetal part which deforms abruptly from its low-temperature state to its high-temperature state when the response temperature is reached and thereby lifts off a movable contact part, which is arranged on a device movable relative to the switch housing, from a stationary contact. The stationary contact is typically arranged in a fixed position inside the switch housing and is electrically connected to one of the two external terminals of the switch, while the moving contact part interacts either via the bimetal part or a spring part associated with the bimetal part.

For certain applications, such switches must be equipped with special encapsulations, which usually have to be provided in addition to the conventional switch housing of the switch. This is necessary, for example, if such temperature-dependent switches are applied in corrosive or explosive environments. The same applies if temperature-dependent switches are inserted in environments in which the switches are exposed to comparatively high external pressures.

In the aforementioned applications, it can be required for safety reasons that the temperature-dependent switches are hermetically gas-tight or encapsulated in a hermetically gas-tight manner.

In the switch disclosed in DE 37 33 693 A1 mentioned at the beginning, this is solved by inserting the switch into an additional metal housing, which is provided with a separate cover, which is also made of metal and is welded to the metal housing after the switch has been inserted. Pressure glass feedthroughs made of glass are provided in this cover, through which the connecting cables of the switch are routed from the inside to the outside. Before the metal housing is hermetically sealed, but after the switch has been inserted, the metal housing is flushed with inert gas, preferably helium or nitrogen, and filled with this gas if necessary. The connecting cables are typically laser-welded and the pressure glass feedthroughs are fused with the metal housing.

In this way, a hermetically encapsulated temperature switch can be provided that is configured to be extremely pressure-resistant and can be used in corrosive and potentially explosive environments.

However, the method of manufacturing the encapsulated temperature switch disclosed in DE 37 33 693 A1 has various disadvantages. Firstly, the manufacture of the hermetically encapsulated switch described therein requires a high level of manual labor. In addition, the temperature-dependent switch mechanism arranged inside the switch housing can be damaged when closing the metal housing or attaching the pressure glass feedthroughs made of glass. Such glass melts lead to extremely high temperatures during their manufacture. However, common temperature-dependent switching mechanisms that are inserted inside the switch can typically be exposed to a maximum of 200 to 500° C. without causing damage to the bimetal part inserted in them.

SUMMARY

It is an object to provide an improved casing for receiving, in a hermetically sealed manner, a temperature-dependent switch, which casing is as simple as possible to manufacture, which enables simple and preferably automated handling and which does not require the switch together with its switching mechanism to be exposed to critical (high) temperatures to encapsulate the switch.

According to an aspect, a casing is provided that is configured to receive, in a hermetically sealed manner, a temperature-dependent switch that is configured to switch in a temperature-dependent manner between a closed state, in which the switch establishes an electrically conductive connection between a first external terminal and a second external terminal, and an open state, in which the switch disconnects the electrically conductive connection, wherein the casing comprises:

- a first metal casing part;
- a second metal casing part which is fixed to the first metal casing part by a hermetically sealing, electrically insulating connection; and
- a third electrically insulating casing part arranged between the first metal casing part and the second metal casing part;

wherein the first metal casing part and the second metal casing part together form a receptacle that is configured to receive the temperature-dependent switch such that, when inserted into the receptacle, the temperature-dependent switch is electrically connected to the first metal casing part by its first external terminal and electrically connected to the second metal casing part by its second external terminal.

The casing is thus constructed in at least three parts, having a first casing part made of metal, a second casing part made of metal and a third casing part made of electrically insulating material, which is arranged between the first casing part and the second casing part and ensures electrical insulation of these two casing parts. The three casing parts together form a receptacle for the temperature-dependent switch, in which it can be inserted.

One advantage of the casing is that the casing with its three casing parts can be pre-produced as a semi-finished product in advance, i.e. before the switch is inserted into it. This simplifies the final completion immensely, as the switch only has to be inserted into the prefabricated receptacle in a final work step and hermetically sealed in it. This final work step can include the production of a welded, fused or soldered connection, which can easily be automated.

In particular, it is advantageous that the hermetically sealing, material-locking, electrically insulating connection between the first casing part and the second casing part can be made in advance, i.e. before the switch is inserted. The melting processes typically required for this, which generate very high temperatures, therefore have no effect on the switch itself, as it is only inserted into the casing afterwards. The switching mechanism of the switch is therefore not damaged. This is a significant difference to DE 37 33 693 A1, for example, in which the pressure glass feedthroughs made of heated glass can only be produced after the switch has been inserted into the metal housing.

A further advantage of the casing is that the electrical connection of the switch is very simple, preferably automated, and inexpensive despite the insertion into the casing. When the switch is inserted into the casing, contacting of the first external terminal of the switch with the first casing part of the casing and of the second external terminal of the switch with the second casing part of the casing is preferably carried out automatically by a corresponding electrical contacting system. By making corresponding electrical contacting between the two casing parts of the casing, the switch can thus be electrically connected in a very simple manner even after insertion into the casing, for example in order to connect it electrically in series with the supply circuit of the device to be protected.

In a refinement, the hermetically sealing material-locking, electrically insulating connection between the first casing part and the second casing part comprises a glass-to-metal seal.

Such a glass-to-metal seal enables an electrically insulating connection between the two casing parts on the one hand and a hermetically sealing connection between these two casing parts on the other.

Such glass-to-metal seals enable hermetically sealed connections that meet the requirements of DIN EN 60079-15. According to this, a hermetically sealed connection or a hermetically sealed device is understood to mean a connection/device that is constructed in such a way that it cannot be opened and that is so effectively sealed by fusing that the insertion of external atmosphere is prevented. Preferably, such a hermetically sealed connection enables a vacuum-tight connection between the first and second casing parts.

The term "hermetic" or "hermetically sealed" herein refers to a hermetic connection or a hermetic seal that prevents the exchange of substances from the inside to the outside and from the outside to the inside. Typically, such hermetic closures have a leakage rate of less than 1e-7 mbar·l/s determined by means of a helium leak detector. Achieving such a hermetically sealed device/connection in accordance with DIN EN 60079-15 is generally only possible by fusing metal to metal or glass to metal.

In a preferred refinement, the glass-to-metal seal therefore comprises glass which is fused to the first casing part and the second casing part. This fused joint is preferably a fused joint that extends along a closed contour, for example an annular contour. This means that a hermetically sealed space can be created inside the casing.

In a refinement, the glass-to-metal seal comprises glass connected to/fused with the first, second and third casing parts.

This has the advantage that the glass-to-metal seal between the first and the second casing part also simultaneously fixes the third casing part of the casing. This means that all three casing parts of the casing can be fixed relative to each other in advance, i.e. before the switch is inserted into the receptacle, by means of the glass-to-metal seal.

The glass-to-metal seal is particularly preferred laser welded. This means that a permanently stable connection can be created that permanently meets the above-mentioned requirements with regard to hermetic sealing.

In a further refinement, the first casing part at least partially surrounds the second casing part and/or the third casing part. Particularly preferably, the first casing part at least partially surrounds both the second casing part and the third casing part.

The first casing part forms the outermost shell, so to speak, of the casing. Since the first casing part is made of metal, this enables a further simplified electrical connection of the first casing part and thus of the first external terminal of the switch inserted in the casing.

In a preferred refinement, the first casing part is substantially pot-shaped.

The first casing part is therefore particularly suitable for accommodating the two other casing parts of the casing. The second and the third casing part can thus be arranged in a suitable way in the first casing part in a protected manner.

In a further refinement, the first casing part comprises an indentation that forms part of the receptacle on an inner side and is electrically connected to the first external terminal of the switch when the switch is inserted into the receptacle.

This indentation in the first casing part enables simplified electrical contacting between the first external terminal of the switch and the first casing part. The inside of this indentation preferably serves as a mechanical support for the first external terminal. To improve the mechanical and electrical contact between this inner side and the first outer connection of the switch, a solder reservoir can be provided on the inner side, so that by inserting a soldering pin or heating stamp into this indentation, soldering of the first outer connection of the switch with the inner side of the indentation, i.e. the first casing part of the receptacle, can take place after the switch has been inserted into the receptacle.

In a further refinement, the second casing part and/or the third casing part is annular.

This makes it possible to provide a space-saving arrangement of the casing. "Annular" in the present sense does not necessarily mean circular, but can also be an oval, angular or prismatic closed contour.

While the first and second casing parts are preferably each made of metal, the third casing part is preferably made of ceramic. Ceramic is an ideal electrical insulator and also a mechanically high-strength material, so that the mechanical stability of the receptacle can also be improved as a result.

In a further refinement, the second casing part is preferably carried by the third casing part. According to this refinement, the third casing part is inserted into the first casing part, and the second casing part rests on top of the third casing part. This type of arrangement enables a simple and quick way of assembling the casing, which can be carried out automatically without further ado.

In a further refinement, an outer diameter of the third casing part is larger than an outer diameter of the second casing part. The third casing part can thus electrically shield the second casing part from the first casing part. The outer edge of the third casing part can rest against the inner wall of the first casing part. This achieves automatic centering of the third casing part.

In a further refinement, an inner diameter of the second casing part equals an inner diameter of the third casing part.

This has the advantage that the second and third casing parts together form a common inner wall or aligned inner walls of the receptacle into which the switch can be inserted. This means that the switch can be inserted into the receptacle very easily and is thereby automatically centered or oriented.

As already mentioned at the beginning, this disclosure relates not only to the casing itself, but also to the casing having a temperature-dependent switch inserted or arranged in the casing. The casing including the switch inserted therein are herein denoted as "sealed switching device".

According to an aspect, a sealed switching device is provided, comprising:

- a casing having a first metal casing part, a second metal casing part fixed to the first metal casing part by a hermetically sealing, electrically insulating connection, and a third electrically insulating casing part arranged between the first metal casing part and the second metal casing part, wherein the first metal casing part and the second metal casing part together form a receptacle; and
- a temperature-dependent switch configured to switch in a temperature-dependent manner between a closed state, in which the switch establishes an electrically conductive connection between a first external terminal and a second external terminal, and an open state, in which the switch disconnects the electrically conductive connection;
- wherein the temperature-dependent switch is arranged in the receptacle, wherein the first external terminal is electrically connected to the first metal casing part, and wherein the second external terminal is electrically connected to the second metal casing part.

In a preferred refinement, the temperature-dependent switch includes a temperature-dependent switching mechanism and a switch housing in which the switching mechanism is arranged, wherein the first external terminal and the second external terminal are arranged on the switch housing.

The switch housing preferably comprises a lower part made of electrically conductive material and a cover part made of electrically conductive material which closes the lower part and is electrically insulated from the lower part, wherein the first external terminal is arranged on the cover part and the second external terminal is arranged on the lower part.

The switch is therefore preferably a switch with a current-carrying housing. The two parts of the switch housing are preferably electrically insulated from each other by means of an insulating foil or other insulating body. The casing parts of the casing preferably completely surround the switch housing of the switch in order to ensure the hermetic sealing. Thereby, the first casing part is in contact with the cover part and the second casing part is electrically connected to the lower part of the switch housing.

In a first refinement, the switch housing, preferably the lower part of the switch housing, is connected to the second casing part in a material-locking manner.

This material-locking connection is preferably also carried out as a hermetically sealing connection, which comprises a metal fusion and is produced, for example, by welding or soldering. As this material-locking connection is made directly on the switch housing, however, it can only be made after the switch has been inserted into the casing. Accordingly, it is important to ensure that as little heat as possible is generated thereby in order to prevent damage to the switching mechanism arranged inside the switch housing.

In an alternative refinement, the casing can further comprise a fourth casing part made of metal, which closes the second casing part on at least one side and is fixed to the second casing part in a material-locking manner.

This material-locking connection is also preferably designed as a hermetically sealing connection in the above-mentioned sense. Compared to the above-mentioned direct material-locking connection of the switch housing with the second casing part, this refinement has the advantage that no direct material connection is made to the switch housing itself. This in turn has a particularly gentle effect on the switching mechanism arranged inside the switch housing.

In a further refinement, the switch housing is clamped in the receptacle of the casing by a spring element.

The spring element preferably acts directly on the switch housing from the outside, whereby the contact pressure between the switch housing and the casing can be improved. This ensures that the switch is securely electrically contacted and mechanically fixed within the receptacle.

It is to be understood that the features mentioned above and those to be explained below can be used not only in the combination indicated in each case, but also in other combinations or on their own, without departing from the scope of the present disclosure.

DESCRIPTION OF PREFERRED EMBODIMENTS

Figure 1:
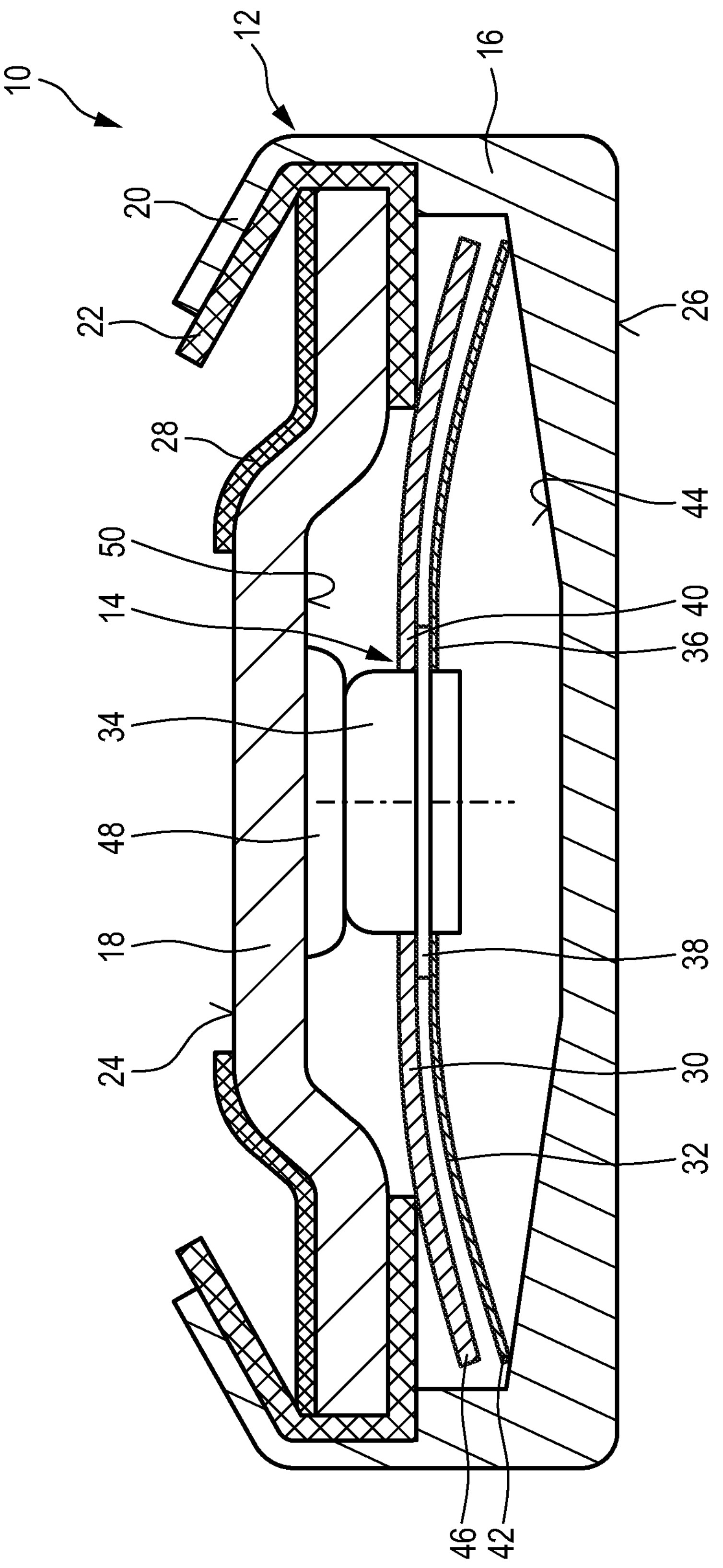
FIG. 1 shows a schematic sectional view of an exemplary temperature-dependent switch which can be mounted in the presented casing, wherein the switch is in its low-temperature state.
Figure 2:
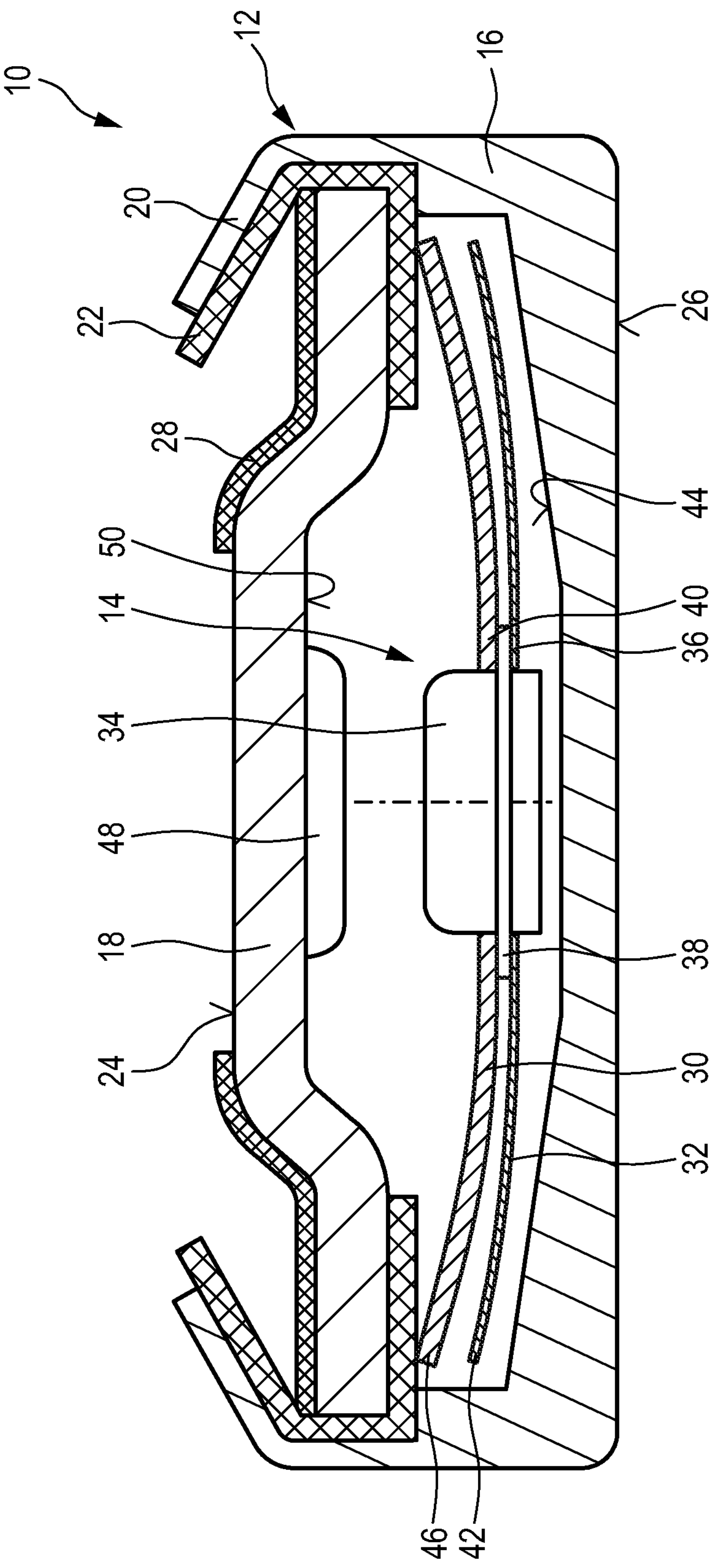
FIG. 2 shows a schematic sectional view of the switch shown in FIG. 1, wherein the switch is in its high-temperature state.

FIGS. 1 and 2 show an exemplary temperature-dependent switch which can be inserted into the casing and can be hermetically sealed by means of the latter. The switch is denoted in its entirety with the reference numeral 10.

FIG. 1 shows the low temperature state of switch 10. FIG. 2 shows the high temperature state of switch 10.

It shall be understood that the switch 10 shown in FIGS. 1 and 2 is only one example of various possible temperature-dependent switches that can be inserted into the casing and can be hermetically sealed in a gas-tight manner by means of this device. As can be seen in particular from FIGS. 3-5, the casing is in principle also suitable for receiving switches with a different design. However, the switch 10 shown in FIGS. 1 and 2 is described in the following as an example of a possible temperature-dependent switch in order to explain the basic structure and function of such a temperature-dependent switch.

The switch 10 comprises a switch housing 12, inside which a temperature-dependent switching mechanism 14 is arranged. The switch housing 12 comprises a pot-like lower part 16 and a cover part 18, which is held on the lower part 16 by a bent or flanged upper edge 20 of the lower part 16.

In the example of the switch 10 shown in FIGS. 1 and 2, both the lower part 16 and the cover part 18 are made of an electrically conductive material, preferably metal. An insulating foil 22 is arranged between the lower part 16 and the cover part 18. The insulating foil 22 provides electrical insulation of the lower part 16 from the cover part 18. Likewise, the insulating foil 22 provides a mechanical seal that prevents liquids or contaminants from entering the interior of the switch housing 12 from the outside.

Since the lower part 16 and the cover part 18 in this example are each made of electrically conductive material, thermal contact to a device to be protected can be established via their outer surfaces. The outer surfaces also serve as the electrical external terminal of the switch 10. For example, the outer surface 24 of the cover part 18 can serve as the first electrical external terminal and the outer surface 26 of the lower part 16 can serve as the second electrical external terminal of the switch 10.

A further insulation layer 28 is arranged on the outside of the cover part 18 in the example of the switch 10 shown in FIGS. 1 and 2.

The switching mechanism 14 is arranged clamped between the lower part 16 and the cover part 18. The switching mechanism 14 comprises a bimetal part 30, a spring part 32 and a movable contact part 34. The bimetal part 30 comprises a temperature-dependent bimetal snap-action disc with a central opening provided therein, with which the bimetal snap-action disc is slipped over the movable contact part 34.

The spring part 32 comprises a temperature-independent snap-action spring disc, which is also placed over the movable contact part 34 with a centric opening provided therein, but from an opposite bottom side. The two snap-action discs 30, 32 are therefore fitted over the movable contact part 34 from opposite sides.

In the low-temperature state of the switch 10 shown in FIG. 1, the snap-action spring disc 32 supports the movable contact part 34 from below by pressing with its inner edge 36 from below against a circumferential, annular collar 38 of the movable contact part 34. Here, the snap-action spring disc 32 is supported with its inner, circumferential edge 42 on the inner base 44 of the lower part 16.

In this state of the switch, the inner edge region 40 of the bimetal snap-action disc 30 preferably rests freely on this collar 38 of the movable contact part 34 from the opposite top side. The outer, circumferential edge 46 of the bimetal snap-action disc 30 hangs freely into the interior of the switch housing 12. In this type of switch 10, the bimetal snap-action disc 30 is thus stored almost force-free in the switch housing 12 in the low-temperature state, without being firmly clamped therein.

In the low-temperature state of the switch 10 shown in FIG. 1, the temperature-dependent switching mechanism 14 establishes an electrically conductive connection between the two external terminals 24, 26 by pressing the movable contact part 34 against a stationary contact part 48 arranged on the cover part 18. The contact pressure with which the movable contact part 34 is pressed against the stationary contact part 48 in the low-temperature state of the switch is effected in the switch 10 by the snap-action spring disc 32.

The two parts 16, 18 of the switch housing 12 thus act as electrodes between which the switching mechanism 14 switches. At the same time, the two outer surfaces of these parts 16, 18 of the switch housing 12 serve as external terminals 24, 26 of the switch 10.

If, starting from the low temperature state of the switch 10 shown in FIG. 1, the temperature of the device to be protected and thus the temperature of the switch 10 and the bimetal snap-action disc 30 arranged therein increases to the response temperature of the switch mechanism 14, which corresponds to the response temperature of the bimetal snap-action disc 30, or above this response temperature, the bimetal snap-action disc 30 snaps from its convex low temperature configuration shown in FIG. 1 to its concave high temperature configuration shown in FIG. 2. During this snap-action, the bimetal snap-action disc 30 is supported with its outer edge 46 on the bottom side 50 of the cover part 18. With its center or its inner edge area 40, the bimetal snap-action disc 30 thereby presses the movable contact part 34 downwards and lifts off the movable contact part 34 from the stationary contact part 48. As a result, the snap-action spring disc 32 simultaneously bends downwards at its center, so that the snap-action spring disc 32 snaps over from its first geometric configuration shown in FIG. 1 into its second geometric configuration shown in FIG. 2. The electrically conductive connection between the two external terminals 24, 26 of the switch 10 previously established via the switching mechanism 14 is thus interrupted.

The temperature-dependent switching mechanism 14 of the switch 10 is thus configured to establish and disconnect the electrically conductive connection between the two external terminals 24, 26 in a temperature-dependent manner. Below the response temperature of the bimetal snap-action disc 30, the switching mechanism 14 is in its low-temperature state shown in FIG. 1, in which it establishes the electrically conductive connection between the two external terminals 24, 26. As soon as the response temperature of the bimetal snap-action disc 30 is exceeded, the bimetal snap-action disc 30 moves the switching mechanism 14 into the high-temperature state shown in FIG. 2, in which the electrically conductive connection between the two external terminals 24, 26 is interrupted. A subsequent cooling of the bimetal snap-action disc 30 below its response temperature moves the switching mechanism 14 back into its low-temperature state shown in FIG. 1, in which the switch 10 is closed again.

Figure 3:
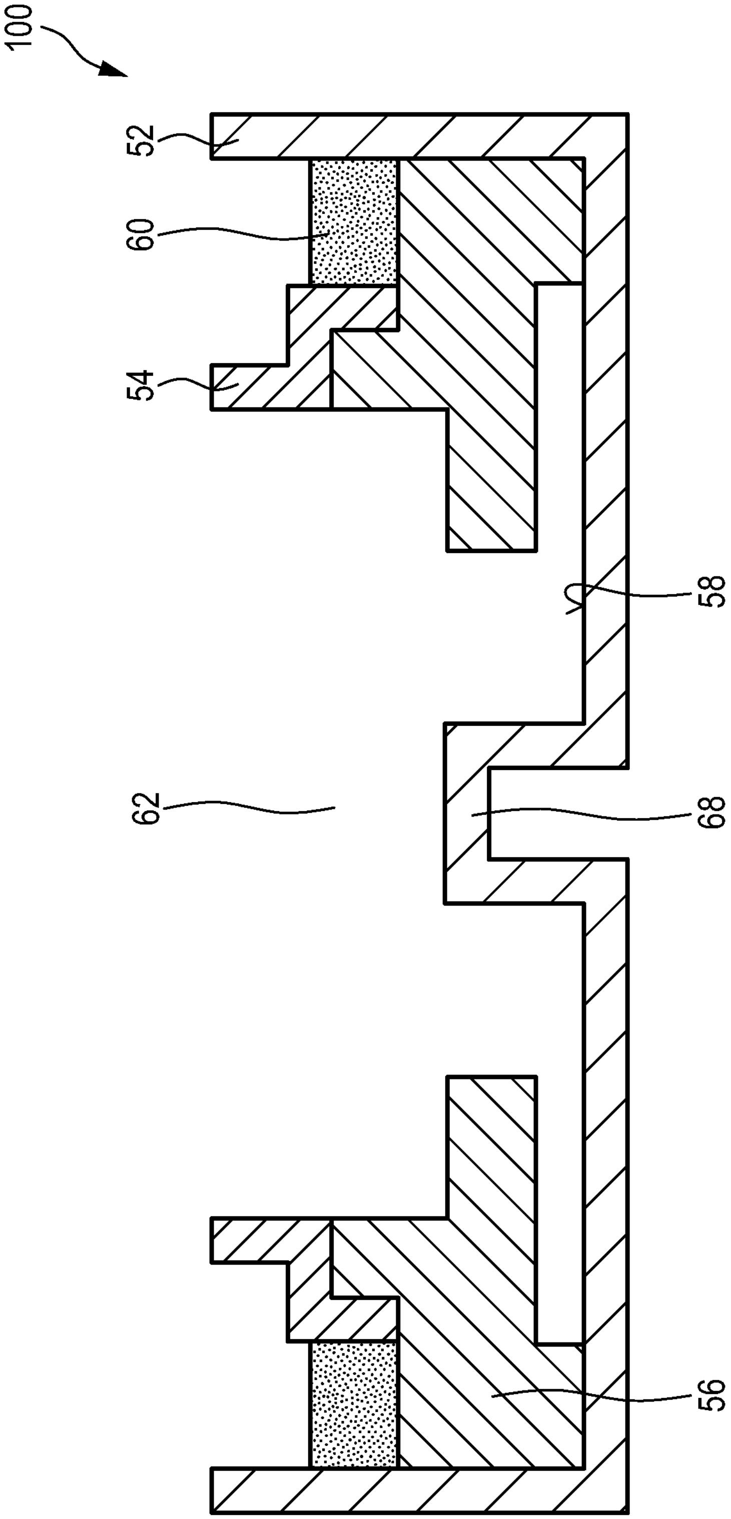
FIG. 3 shows a schematic sectional view of a first embodiment of the casing without a switch inserted therein.

FIG. 3 shows a first embodiment of the casing in a schematic sectional view without the switch inserted therein. The casing is denoted in its entirety with the reference numeral 100.

The casing 100 serves to receive a switch 10 and acts as a kind of outer housing that additionally surrounds the switch housing 12 of the switch 10. The casing 100 including the switch 10 inserted therein are herein denoted as "sealed switching device". The casing 100 comprises a substantially pot-shaped first casing part 52 made of metal. A second casing part 54 and a third casing part 56 are arranged in this first casing part 52. The two casing parts 54, 56 are essentially annular in shape. They therefore form a circumferentially closed contour. The two casing parts 54, 56 are each provided as a type of profiled ring.

The second casing part 54 is also made of metal. The third casing part 56, on the other hand, is made of electrically insulating material. Preferably, the third casing part 56 is made of ceramic.

The third casing part 56 serves to electrically insulate the first casing part 52 from the second casing part 54. The two casing parts 52, 54 are preferably made of steel.

The second casing part 54, which is provided as a profiled ring, is placed on the third casing part 56, which is also provided as a profiled ring, and is carried by the latter. The third casing part 56 rests on the inner base 58 of the first casing part 52. The outer diameter of the third casing part 56 corresponds approximately to the inner diameter of the first casing part 52, so that the third casing part 56 is preferably inserted into the first casing part 52 with a precise fit.

The two metallic casing parts 52, 54 are permanently connected to each other via a hermetically sealing, material-locking, electrically insulating connection 60. This hermetically sealing, material-locking connection 60 is provided as a fused joint comprising a glass. The connection 60 is a hermetically sealing glass-to-metal seal that fulfills the sealing requirements specified in DIN EN 60079-15.

The hermetically sealing connection 60 between the two casing parts 52, 54 is preferably produced by means of laser welding. The hermetically sealing connection 60 extends along a closed, annular contour and thus hermetically seals the space between the two casing parts 52, 54 along the entire circumference. At the same time, the third casing part 56 is also connected to the two metallic casing parts 52, 54 by means of this glass connection 60. The three casing parts 52, 54, 56 of the casing 100 thus form an inseparably connected unit.

Inside the casing 100, the three casing parts together form a kind of cavity which is suitable as a receptacle 62 for a temperature-dependent switch 10 to be inserted therein.

In the herein shown embodiment, the inner diameter of the second casing part 54 corresponds to the inner diameter of the third casing part 56. This makes it easier to insert the switch 10 into the receptacle 62. The two inner diameters of the casing parts 54, 56 are preferably slightly larger than the outer diameter of the lower part 16 of the switch 10.

Figure 4:
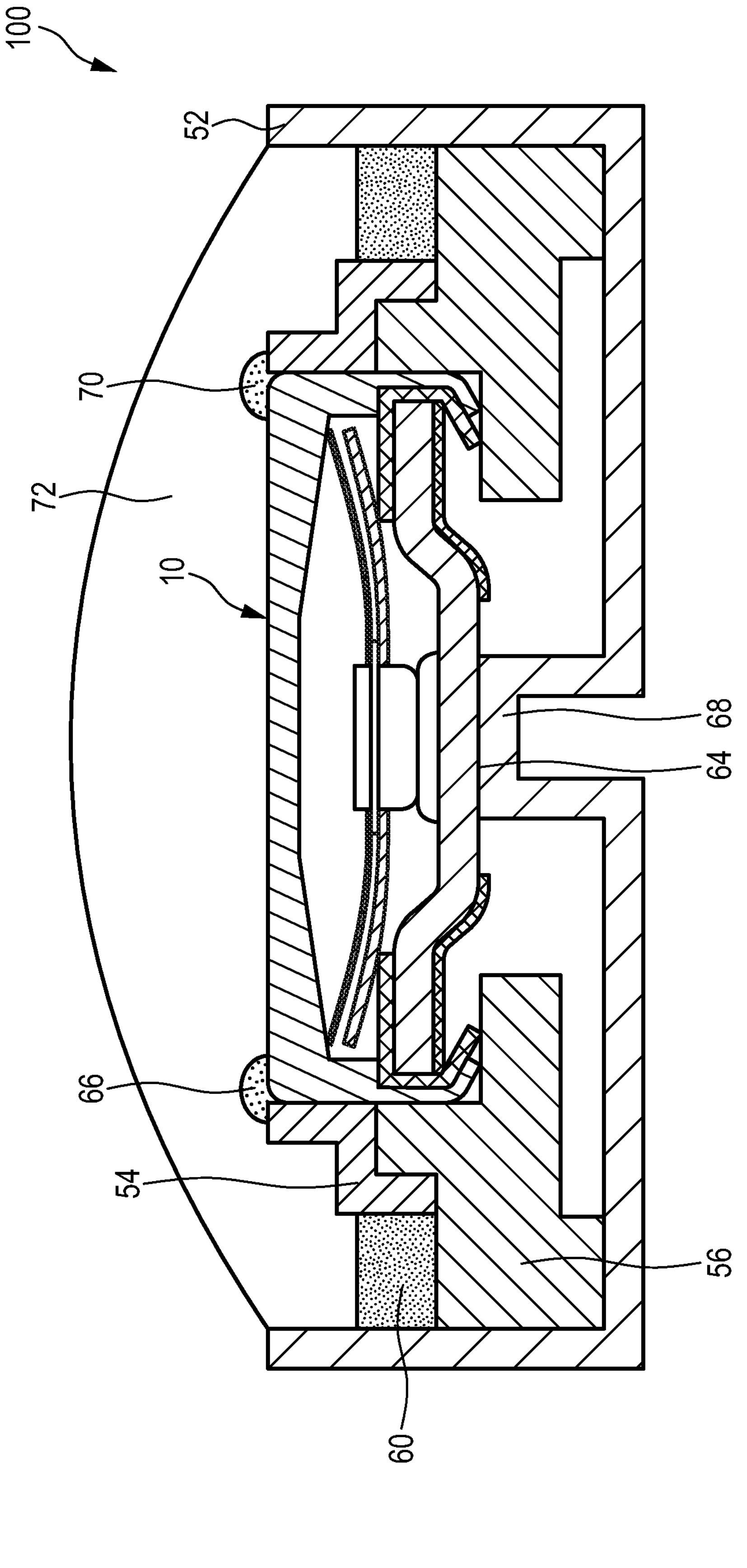
FIG. 4 shows a schematic sectional view of the casing shown in FIG. 3 with a switch inserted therein.

FIG. 4 shows in a schematic way how the switch 10 can be inserted into the receptacle 62 of the casing 100. In the herein shown embodiment, the switch 10 is inserted "upside down" into the receptacle 62. This means that the lower part 16 of the switch 10 points upwardly, while the cover part 18 of the switch 10 points downwardly and faces the bottom of the receptacle 62.

In the state inserted into the receptacle 62, the first external terminal 24 of the switch 10, which is formed by the outer side of the cover part 18, contacts the first casing part 52 at the contact point marked with reference sign 64. At the second contact point marked with reference sign 66, the second external terminal 26 of the switch 10, which is formed by the outer side of the lower part 16, circumferentially contacts the second casing part 54. For mechanical stabilization, the switch 10 also rests with its bent upper edge 20 of the lower part 16 on the third casing part 56, although this is not necessarily required. It is only important that the two external terminals 24, 26 of the switch 10 are each electrically conductively connected to one of the two metallic casing parts 54, 56. In this way, the two casing parts 52, 54 of the casing 100 can be used as external electrical terminals of the switch 10.

The first casing part 52 comprises an indentation 68 provided centrally in its base section, on the inside of which the first contact point 64 is provided, on which first contact point the switch 10 rests with its first external terminal 24 or with its cover part 18. To improve the electrical contact, soldering material can be arranged at this contact point 64, which can be activated by external heat, for example by a heat stamp inserted into the indentation 68, to permanently connect the first casing part 52 with the cover part 18 or the first external terminal 24 of the switch 10 after insertion of the switch 10.

A second fused joint is provided at the second contact point 66, which serves for a hermetically sealing connection between the second outer connection 26 or the lower part 16 of the switch 10 and the second casing part 54 of the casing 100. This second fused joint 70 is also made along a closed, annular contour, i.e. along the entire circumference of the switch 10 or along the entire inner circumference of the second casing part 54. Thus, the temperature-dependent switching mechanism 14 arranged inside the switch housing 12 is hermetically sealed by means of the casing 100.

For additional sealing and mechanical stabilization, the switch 10 fixed in the casing 100 can additionally be covered with a resin hood 72.

Figure 5:
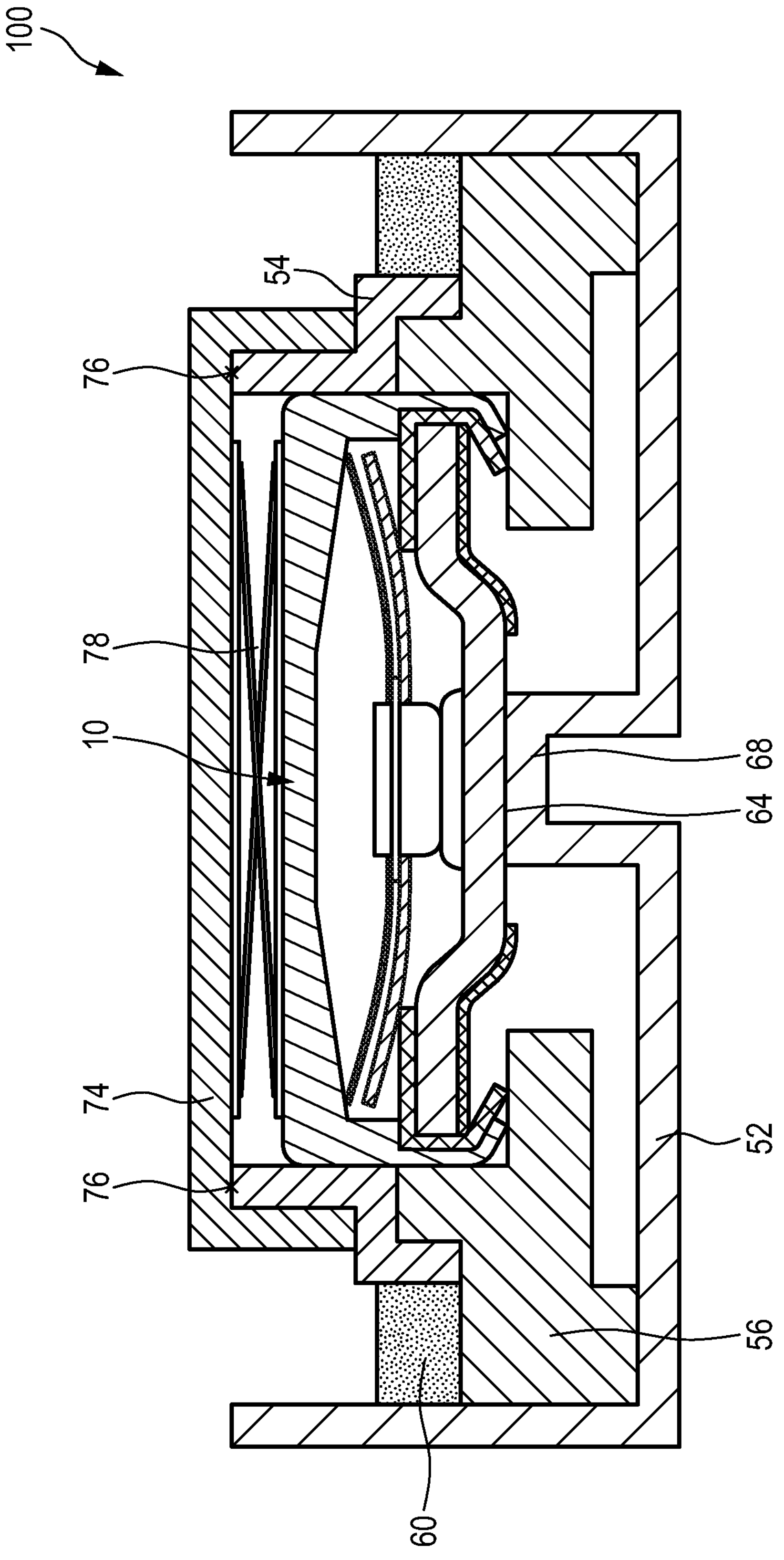
FIG. 5 shows a schematic sectional view of a second embodiment of the casing with a switch inserted therein.

FIG. 5 shows a second embodiment of the casing 100. The three casing parts 52, 54, 56 of the casing 100 are thereby designed in the same way as before (see FIGS. 3 and 4). However, here the second casing part 54 is no longer directly connected to the lower part 16 or the second external terminal 26 of the switch 10 in the inserted state of the switch 10.

In the second embodiment shown in FIG. 5, the casing 100 comprises a fourth casing part 74 which functions as a way of closing the second casing part 54. The fourth casing part 74 is also made of metal. It closes the second casing part 54 on one side of its top side and is connected to the second casing part 54 by a material bond. A fused joint 76, which is preferably designed as a circumferential welded connection, is provided for this purpose. Thus, the interior of the casing 100, which serves as a receptacle 62 for the switch, is also hermetically sealed in this embodiment.

Furthermore, according to the second embodiment shown in FIG. 5, the casing 100 comprises a spring element 78 which serves to clamp the switch 10 in the receptacle 62. On the one hand, this spring element 78 ensures electrical contact between the second outer connection 26 of the switch 10 and the second and fourth casing parts 54, 74 and also generates a contact pressure with which the first external terminal 24 of the switch 10 is pressed against the first casing part 52.

Both embodiments of the casing 100 shown at present thus ensure a hermetically sealing or encapsulation of the switch 10, by which the switching mechanism 14 arranged in the interior of the switch housing 12 is enclosed in a gas-tight manner towards the outside. The interfaces between the individual casing parts 52, 54, 56, 74 are each realized as standard by hermetically sealed fusion joints, which are provided either as metal-to-metal fused joints or as glass-to-metal joints. Despite the hermetic sealing within the casing 100, the switch 10 can still be electrically connected in a simple way.

Due to the modular design of the casing 100, it is suitable for the hermetic encapsulation of temperature-dependent switches of various designs. The switch 10 shown schematically in FIGS. 1 and 2 is only one example that can be hermetically sealed with the casing 100.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A casing for receiving, in a hermetically sealed manner, a temperature-dependent switch that is configured to switch in a temperature-dependent manner between a closed state, in which the switch establishes an electrically conductive connection between a first external terminal and a second external terminal, and an open state, in which the switch disconnects the electrically conductive connection, wherein the casing comprises:

a first metal casing part;

a second metal casing part which is fixed to the first metal casing part by a hermetically sealing, electrically insulating connection; and a third electrically insulating casing part arranged between the first metal casing part and the second metal casing part;

wherein the first metal casing part and the second metal casing part together form a receptacle that is configured to receive the temperature-dependent switch such that, when inserted into the receptacle, the temperature-dependent switch is electrically connected to the first metal casing part by its first external terminal and electrically connected to the second metal casing part by its second external terminal.

2. The casing according to claim 1, wherein the hermetically sealing, electrically insulating connection between the first metal casing part and the second metal casing part comprises a glass-to-metal seal.

3. The casing according to claim 2, wherein the glass-to-metal seal comprises glass that is fused with the first metal casing part, the second metal casing part and the third electrically insulating casing part.

4. The casing according to claim 1, wherein the first metal casing part surrounds at least one of the second metal casing part and the third electrically insulating casing part.

5. The casing according to claim 1, wherein the first metal casing part is pot-shaped.

6. The casing according to claim 1, wherein the first metal casing part comprises an indentation forming a part of the receptacle on an inner side of the casing and being configured to be electrically connected to the first external terminal of the switch when the switch is inserted into the receptacle.

7. The casing according to claim 1, wherein at least one of the second metal casing part and the third electrically insulating casing part is annular.

8. The casing according to claim 1, wherein the third electrically insulating casing part comprises a ceramic material.

9. The casing according to claim 1, wherein a first inner diameter of the second metal casing part equals a second diameter of the third electrically insulating casing part.

10. A sealed switching device, comprising:

a casing having a first metal casing part, a second metal casing part fixed to the first metal casing part by a hermetically sealing, electrically insulating connection, and a third electrically insulating casing part arranged between the first metal casing part and the second metal casing part, wherein the first metal casing part and the second metal casing part together form a receptacle; and a temperature-dependent switch configured to switch in a temperature-dependent manner between a closed state, in which the switch establishes an electrically conductive connection between a first external terminal and a second external terminal, and an open state, in which the switch disconnects the electrically conductive connection;

wherein the temperature-dependent switch is arranged in the receptacle, the first external terminal is electrically connected to the first metal casing part, and the second external terminal is electrically connected to the second metal casing part.

11. The sealed switching device according to claim 10, wherein the temperature-dependent switch comprises a temperature-dependent switching mechanism and a switch housing, in which the temperature-dependent switching mechanism is arranged, wherein the first external terminal and the second external terminal are arranged on the switch housing.

12. The sealed switching device according to claim 11, wherein the switch housing comprises an electrically conductive lower part and an electrically conductive cover part which closes the electrically conductive lower part and is electrically insulated from the electrically conductive lower part, wherein the first external terminal is arranged on the electrically conductive cover part and the second external terminal is arranged on the electrically conductive lower part.

13. The sealed switching device according to claim 11, wherein the switch housing is joined to the second metal casing part in a material-locking manner.

14. The sealed switching device according to claim 10, wherein the casing further comprises a fourth metal casing part, which closes the second metal casing part on at least one side and is joined to the second metal casing part in a material-locking manner.

15. The sealed switching device according to claim 11, wherein the switch housing is mechanically biased in the receptacle by a spring element.

* * * * *